Inventors
LAWRENCE D. NINNEMAN
WALLACE W. WOLFORD
ATTORNEYS

Inventors
Lawrence D. Ninneman
Wallace W. Wolford

United States Patent Office 3,468,219
Patented Sept. 23, 1969

3,468,219
METHOD OF AND APPARATUS FOR FACING A CONTAINER SEALING SURFACE
Lawrence D. Ninneman and Wallace W. Wolford, Toledo, Ohio, assignors to Owens-Illinois, Inc., a corporation of Ohio
Filed Apr. 12, 1965, Ser. No. 447,175
Int. Cl. B23c *3/00;* B26d *3/00*
U.S. Cl. 90—14                          15 Claims

ABSTRACT OF THE DISCLOSURE

The method and apparatus of the disclosure to remove wste material from a finish portion of a plastic container and face the end of the finish to provide a sealing surface. In the method, containers are transported to a facing station, intercepted at the facing station, and engaged by a fixture at the facing station, and engaged by a fixture at the facing station to a position the container body vertically. The fixture and container are displaced to a position in alignment with a facing mechanism, the container is engaged to rotatably locate the finish thereof, and the finish is engaged to locate the final finish opening at a predetermined level. Then the container and facing mechanism are relatively displaced to remove the waste portion from the finish and provide an even sealing surface. The container is removed from the fixture and transported away for subsequent processing. The apparatus accomplishes the foregoing steps and has a conveyor, an openable-closable fixture to receive a container from the conveyor and position the container vertically, abutments for rotationally orienting the container, finish engaging members for locating the finish in a predetermined position, and a finishing tool for removing the waste material from the finish along a plane referenced to the finish portion of the container.

BACKGROUND OF THE INVENTION

The present invention relates generally to a method of and apparatus for the manufacture of plastic containers and more particularly to a novel, fully automatic system, including method and apparatus for providing an accurately located, geometrically true closure sealing surface at the finish opening of a container, the surface being referenced to the finish of the container rather than to the body of the container.

This invention is primarily useful in facing containers having a blown or like finish and is particularly adaptable for use with blow molded containers having one or more of the following characteristics: (1) a threaded finish, (2) an offset finish, and/or (3) an integral handle, though the invention is not restricted to containers having these specific characteristics.

It is commonplace today to manufacture containers, such as plastic bottles, by blow molding not only the body of the bottle but also the finish thereof, whether the finish is concentric or offset with respect to the body. Such bottles or containers inherently have a waste portion of plastic material around the finish opening which is normally jagged and irregular and which must be evenly separated from the finish in order to provide a sealing surface at the opening with which a closure may be engaged to seal the interior of the bottle or container. A clamping-type cap may be used in conjunction with a plain finish which has been appropriately faced or a threaded cap may be used with a correspondingly threaded finish which has been faced.

By way of specific example only, plastic bottles (say of the half-gallon or gallon veriety having an integral handle adjacent an offset threaded finish) are frequently commercially manufactured by use of the so-called "false funnel" technique. Initially, a pick-up or false finish of relatively large diameter is injection molded at an extrusion orifice. Thereafter, a relatively large tubular parison is extruded from the orifice integral with the pick-up finish. The parison is blown to final shape in a blow mold to form all of the finished container, i.e. the body, the handle, joined through a funnel-shaped connection of waste plastic material to the initially injected pick-up finish. Subsequently, the funnel-shaped connection and the pick-up finish are separated from the offset finish, usually by use of guillotine knife mechanism, leaving a short length of waste material at the finish opening.

The machining or facing of the closure sealing surface by the removal of the waste at the finish opening poses the problem of the prior art which is solved by the present invention.

First, the prior art techniques typically require the manually or semi-manually individual loading and unloading of the containers into and out of the facing mechanism.

Second, the prior art facing operation has produced a sealing surface at the finish opening which was machined by a facing mechanism which was referenced to the body of the container. Therefore, any misalignment of the body of the container with respect to the finish of the container (typically due to unequal cooling and resulting warpage or due to body distortion where the containers are still warm from forming) resulting in misalignment of the sealing surface with respect to the finish.

Third, fragments of waste material often fall into the interior of a container during the described prior art facing procedure, thus requiring cleaning the interior of the container following facing.

SUMMARY OF THE INVENTION

To overcome these deficiencies in the prior art, the present invention provides a fully automatic system for finishing a sealing surface on the blown finish or the like of the containers, while (1) reducing the time and the cost required to manufacture each container, (2) reducing the number of rejects by referencing the sealing surface to the finish, preferably to the threads thereof, rather than to the body of the container, and (3) essentially prohibiting entry into the containers of material fragments machined from the finish opening.

In the presently preferred embodiment of this invention, the closure sealing surface is faced upon an offset finish opening of a plastic container wherein the finish has an integral waste portion at the finish opening caused by blow molding of the offset finish utilizing the so-called "false funnel" technique. Containers of this type are usually, though not necessarily, provided with an integral handle adjacent the offset finish, or with other gripping projections falling within the term "handle." The containers are periodically delivered to a facing station following their removal from a container forming apparatus of the known type. The facing operation and the facing station may constitute either (1) a separate station apart from a deflashing station or (2) a part of the deflashing station, where the handle waste and the like is trimmed from the container following blow molding. A deflasher apparatus of the type referred to is disclosed in application Ser. No. 301,757, filed Aug. 13, 1963, now Patent No. 3,377,899, and assigned to the assignee of the present invention.

A bottle separator having a gate mechanism successively accommodates conveyance of the containers along a continuously moving conveyor to the facing station in timed and spaced relation with respect to each other. A bottle stop mechanism intercepts each successively transported container at the facing station so as to hold the container stationary as the conveyor belt is frictionally displaced beneath the bottom of the upright container. Cylinder driven, partable fixture components are extended and closed on the intercepted container. The fixture which so engages each successive container substantially "encircles" the container so as to position the longitudinal axis of the container in a vertical "upright" position. The container encircling fixture provides the means for removing the container from the continuously moving conveyor, preferably by laterally shuttling the container to one side of the conveyor. Obviously, the fixture-encircled container can be retained in fixed position on the conveyor for further operations, if so desired.

Once the container has been fixed, in a vertical or "upright" position, the bottle is next oriented rotationally, i.e. about its longitudinal vertical axis in the event that the contaner has an "offset" finish which is not in the plane of the longitudinal axis thereof. This can most easily be done by engaging the integral handle of the container, in the event the container is provided with an integral handle, or by engaging other portions of the container which lie in or parallel to planes radial to the container longitudinal axis.

In the presently preferred embodiment of the invention, this orientation is accomplished after the container is removed from the conveyor and while the container is retained in the encirclng fixture, although this rotational orientation can be accomplished simultaneously with the positioning of the longitudinal axis of the container.

The container finish is next positioned accurately by engaging and tightly confining the finish. Where the finish is threaded, this positioning is accomplished by engaging the finish threads with orienting locators having mating semicircular recesses which complement the finish threads, the two locators substantially encircling the container finish and fixing the finish both vertically and horizontally in a predetermined location.

Again, in the presently preferred embodiment of the invention, this engagement is accomplished after the vertical alignment of the container axis and substantially simultaneously with the rotative orientation of the container.

After all three of the locative operations have been completed, i.e. (1) the positioning of the longitudinal axis of the container in a vertical, "upright" posture, (2) the rotative orientation of the container about its longitudinal axis, and (3) the locating and fixing of the finish, the rotating cutting tool is displaced relative to the container to remove the waste plastic portion from the finish at the finish opening. The rotating cutting tool is provided with a depending projection or "pilot" which substantially blocks the opening to the container during displacement of the facing mechanism, and forced air is utilized to carry material fragments away from the finish. Preferably, air under pressure is introduced through the pilot into the interior of the container, this air flowing from the interior of the container about the pilot, to be removed through a vacuum line communicating with a vacuum chamber surrounding the cutting tool and immediately adjacent the container finish.

Finally, the faced container is replaced on the conveyor and the fixture is fully opened to release the container so that the conveyor moves the container away from the facing station for subsequent processing.

Accordingly, it is a primary object of the present invention to provide a novel system, including method and apparatus, for facing an even sealing surface at the finish opening of a container.

Another object of the present invention is the provision of a novel, fully automatic system for facing waste material from a container finish opening to provide an even closure sealing surface, which surface is accurately referenced to the finish per se to insure both proper location and orientation of the surface relative to the finish.

An additional object of the present invention is the provision of a novel method of providing an even closure sealing surface for a container by machining waste material from the finish opening of the container only after the desired sealing surface has been accurately positioned in a vertically aligned, rotationally proper and accurately spaced posture relative to the finish.

A further object is the provision of a novel facing system for providing a closure sealing surface at the finish opening of a container which provides a clean container interior by means of fluid under pressure introduced into the container and exhausted from the container finish to convey material fragments, created during the facing operation, from the container interior and from the finish.

These and other objects and features of this invention will become more fully apparent from the following description and appended claims taken in conjunction with the accompanying drawings, wherein:

GENERAL

Figure 1:
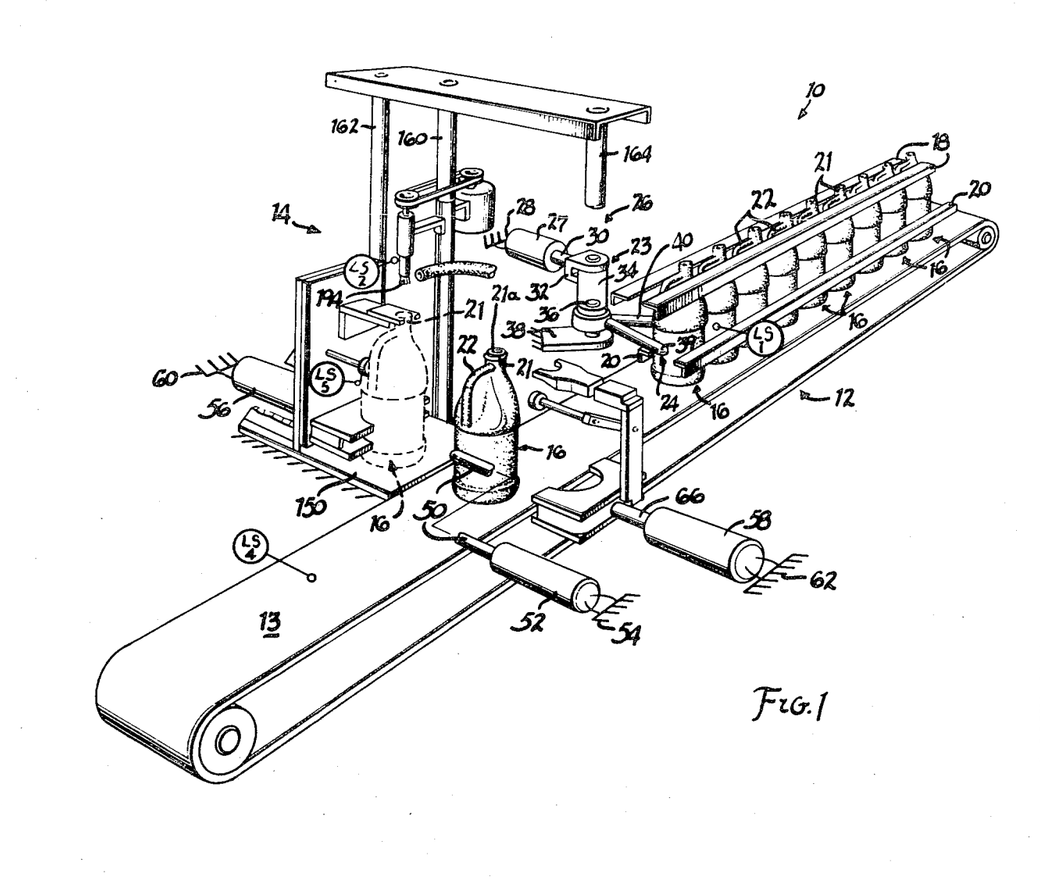
FIGURE 1 is a schematic perspective view depicting a presently preferred, fully automated embodiment of this invention for facing a closure sealing surface on plastic containers.

Reference is now made to the drawings, wherein like numerals are used to designate like parts throughout. In FIGURE 1, the over-all facing apparatus, generally designated 10, includes a continuously moving conveyor 12 having a belt 13 to deliver plastic bottles 16 from a reservoir at which the bottles are confined by guide rails 18 and 20 to a facing station, indicated at 14.

The plastic bottles 16, when formed with a "blown" or like finish, as above described, have excess material 21a aligned with the finish opening and surmounting the threaded bottle finish 21. Such bottles also typically have a projecting handle 22 lying in or parallel to a plane radial to the longitudinal axis of the bottle. The spaced upper guide rails 18 and lower guide rails 20 roughly orient each bottle 16 so that the integral handle 22 of each container is directed toward the downstream or facing station side of the apparatus 10.

The plastic bottles 16 are restrained against movement with the belt 13 by a gate mechanism 23 having a separator fork 24, both constituting part of an over-all bottle separator mechanism 26. A cylinder 27 of the separator mechanism 26 is periodically actuated in timed relation to the operation of the remaining components of the over-all facing apparatus 10 to successively deliver a single bottle 16 to the facing station 14, in a manner to be hereinafter more fully described.

THE BOTTLE SEPARATOR MECHANISM

The cylinder 27 of the bottle separator mechanism 26 is driven by air or hydraulic fluid and is secured to the machine frame (not shown), as indicated at 28. Actuation of the cylinder 27 extends and retracts a piston rod 30 which, through a clevis 32, causes an elongated gate lever 34 of the gate mechanism 23 to rotate clockwise during the extension stroke and counterclockwise during the retraction stroke when viewed as depicted in FIGURE 1. This rotation takes place about a pivot pin 36 which has a fixed vertical pivot axis and is pivotably secured in position by a frame-mounted support 38 of any conventional type. The pin 36 is non-rotatably keyed or otherwise secured to the gate lever 34. The separator fork 24, comprising fingers 39 and 40, is nonrotatably secured to the pin 36, as, for example, by a key (not shown).

Thus, rotation of the pin 36, caused by rotation of the gate lever 34, similarly rotates the separator fork 24, first clockwise as the rod 30 is extended a distance sufficient to permit the one bottle 16 trapper between the fingers 39 and 40 of the separator fork 24 to be released and thereafter conveyed along the belt 13 from the bottle separator mechanism 26 to the facing station 14 by the continuously moving conveyor 12. As the forward finger 39 releases the one bottle 16, the back finger 40 of the separator fork 24 restrains the next successive bottle 16.

Thereafter, as the cylinder rod 30 is retracted, the lever 34, the pin 36 and the separator fork are rotated counterclockwise back to the position illustrated in FIGURE 1. This causes the finger 40 to release the next bottle 16, which bottle is then advanced by the continuously moving conveyor 12 so as to be situated against the forward finger 39 of the separator fork 24, in the manner shown in FIGURE 1.

THE FACING MECHANISM

Each bottle 16 which is delivered to the facing station 14 by the conveyor 12 is intercepted by an elongated stop rod 50 constituting an extension of the piston rod of a cylinder 52, which cylinder is secured at 54 to the frame (not shown) of the over-all facing apparatus 10.

Figure 2:
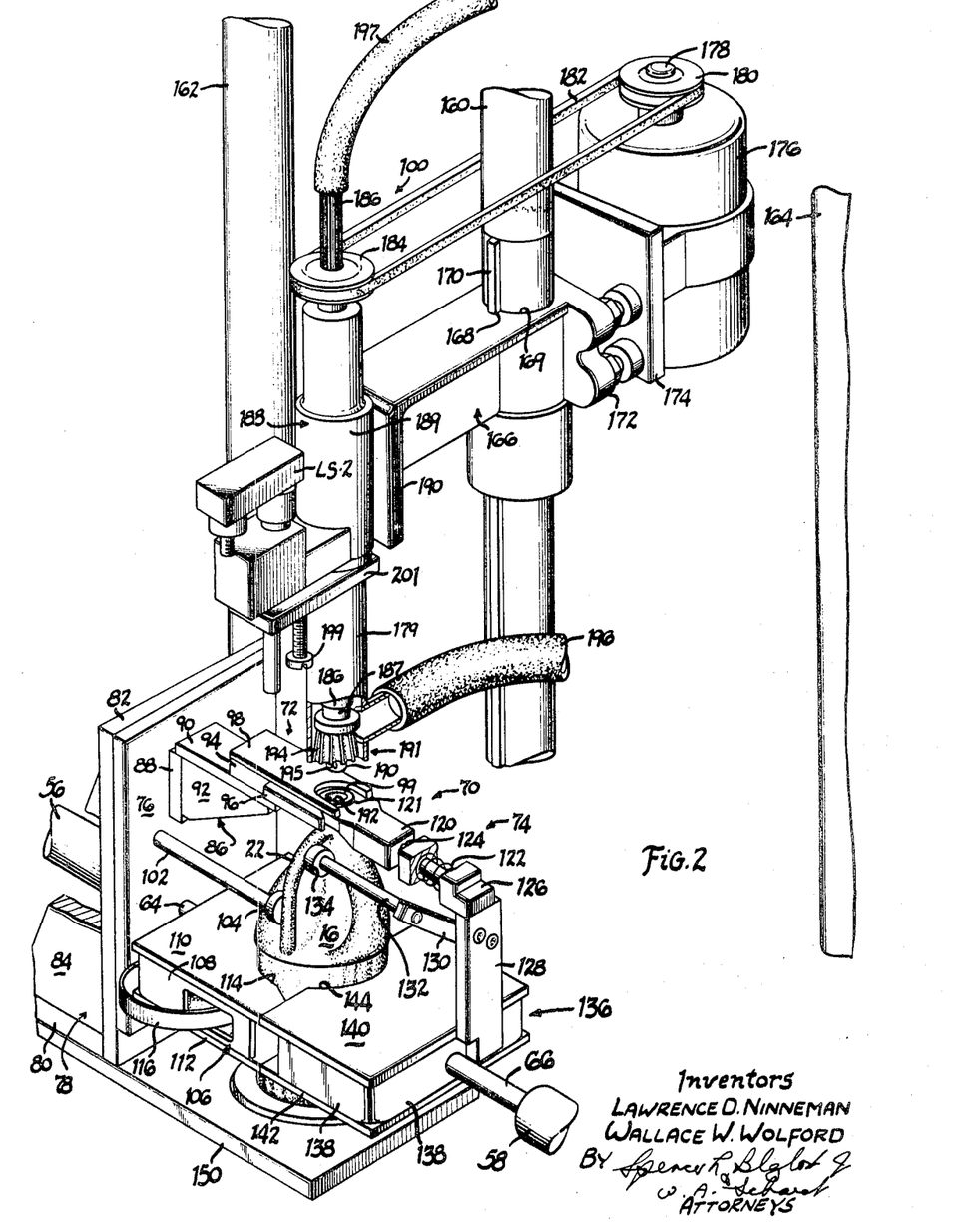
FIGURE 2 is an enlarged, partially schematic perspective representation of a portion of the apparatus of FIGURE 1, i.e. (1) a fixture for successively securing each container in a fixed reference posture with respect to the finish and (2) a drilling unit used to machine away the waste material at the finish opening to provide a closure sealing surface.

The facing station 14 is equipped with a pair of bottle pusher cylinders, i.e. the discharger pusher cylinder 56 and the infeed pusher cylinder 58, which are aligned with respect to each other and which are respectively secured to the frame (not shown) at 60 and 62. As illustrated in FIGURE 2, separable fixture segments 72 and 74 when in their closed position (FIGURE 2), comprise an over-all fixture 70.

The fixture segment 72 comprises a main plate 76, which is carried by means of a bracket 78 which comprises a substantially horizontal planar member 80, a substantially vertical front plate 82, and a pair of side triangularly shaped supports 84. The front plate 82 of the mount bracket 78 may be secured to the main plate 76 of the fixture segment 72 by any conventional means such as a plurality of countersunk bolts which prohibit relative movement between the members 76 and 82. The assembly 72 above described is fixed in position on the machine frame.

In addition to the main plate 76, the fixture portion 72 also includes a support bracket 86 integrally attached to the main plate 76 and comprising back, top and side components 88, 90 and 92, respectively. The support bracket 86 integrally carries a rear locator 94 which is flanked by a pair of side guides 96 and a top guide 98. The rear locator 94 is machined, at 99, to provide grooves (not shown) which correspond to the threads of the finish of the bottle 16, so that when the fixture 70 is in its fully closed position the finish threads on the bottle 16 will fit within the machine grooves to reference the bottle 16 to the elevated drilling unit 100 with respect to the finish threads, rather than the body of the bottle 16. The fixture portion 72 also includes a handle rest extension 102 fixedly projecting from the main plate 76 and having at the free end thereof an abutment 104 for engaging the integral handle 22 of the intercepted bottle 16.

A rear guide support or saddle 106 is integrally secured to piston rod 64 of the cylinder 56 which rod 64 extends through openings in plates 76 and 82. Guide rods (not shown) are provided on opposite sides of rod 64, and secured to the saddle 106, to prevent rotation of the saddle 106. These guide rods are guided through plates 76 and 82. The saddle is in the form of a hollow box and comprises three vertical planar members 108 and top and bottom planar members 110 and 112, respectively. The top and bottom members 110 and 112 each have arcuate recesses 114 which conform to one side of the body of the plastic bottle 16. The saddle or bottle positioner 106 may also be equipped with a stripper spring 116 for urging the bottle 16 out of engagement with the saddle 106 when the fixture component 74 is retracted into the fully opened position.

The fixture portion 74 is analogous in some respects to the fixture portion 72, having a front locator 120 which is spring loaded by a compression spring 122 acting through a rod 124. The front locator 120 is also machined at 121 to provide grooves (not shown) which correspond to the threads of the finish of the bottle 16. The compression spring 122 is housed within a retainer block 126 which is welded or otherwise secured to a generally vertical locator support plate 128.

The locator plate 128 has nonrotatably fastened thereto, by means of welds or the like, a diagonally extending positioner support 130 which integrally carries a handle-engaging extension 132 having an abutment 134 fixed to the free end thereof. The handle abutment 134 is engageable with the handle 22 of the bottle 16 to locate or orient the handle.

The locator plate 128 is attached at its lower end with a front guide support or saddle 136 which engages and thereby vertically aligns the body of the bottle 16, in conjunction with the saddle 106, during the facing operation. The saddle 136 is similar to the saddle 106 in that it includes three vertical side planar members 138 as well as top and bottom plates 140 and 142, respectively. Each plate 140 and 142 has an arcuate recess 144 contoured to fit contiguously against the one side of the body of the bottle 16. The saddle 136 is also provided with guide rods (not shown) to prevent rotation of the saddle 136.

As can be appreciated by inspection of FIGURE 1, the saddles 106 and 136 are closed upon each successively intercepted container 16 while the container is held against conveyor displacement by the stop rod 50 of the cylinder 52. Such closure of the saddle is accomplished by actuating the cylinder 56 to extend the rod 64 thereof, moving the saddle 106 transversely of the conveyor belt 13 and away from the fixed plates 76, 82 until the arcuate recesses 114 engage the adjacent side of the container 16. At the same time, the cylinder 58 is energized to extend the piston rod 66 so that the container 16 is simultaneously engaged by the saddle 136, by the handle-engaging abutment 134 and by the taut neck locator. In this way the bottle 16 is encircled and oriented in the predescribed vertically upright manner.

The bottle 16, encircled by the saddles, is then removed out of contact with the continuously moving belt 13 of the conveyor 12, either by vertically elevating the bottle or, as illustrated in FIGURE 1, by longitudinally displacing the bottle so that the bottom thereof rests upon a table 150. Such longitudinal displacement of the bottle is carried out by further extending the piston rod 66 of the cylinder 58 and retracting the piston rod 64 of the cylinder 56 to move the bottle, still enclosed, by the saddles 106, 136 to the position illustrated in FIGURE 2. When this position is obtained, the handle-engaging abutment 104 cooperates with the abutment 134 to rotationally index the bottle, as hereinafter more fully described, and the bottle finish is contacted by the rear locator 94 so that the neck is tightly confined between the locators 94 and 120.

While the table 150 is shown as being stationary, it is to be appreciated that the table could be equipped with a lift cylinder to elevate the bottle during or before the facing operation, or to exert a small upwardly directed force upon the body of the bottle during the facing operation.

Aligned with the table 150 and with the fixture 70, when in the facing position depicted in FIGURE 2, is a drilling unit generally designated 100. The unit 100 is displaceably supported upon a drilling support column 160 intermediate two frame column supports 162 and 164, respectively. The drilling unit 100 is supported upon the drilling support column 160 by a mount bracket 166 which has an aperture 169 equipped with a keyway 168 for receiving a key 170, which key is fitted within an elongated recess in the column 160 to properly orient the drilling unit 100 and avoid relative rotational movement of the drilling unit 100 about the column 160. The bracket 166, in addition to having a cylindrical aperture 169 through which the column support 160 extends, has a back plate 172. A motor mount plate 174 is adjustably supported by the plate 172 by means of threaded bolts or the like and has an electrical motor 176 secured to the motor mounting plate in a conventional manner.

A drive shaft 178 extends from the motor 176 and has nonrotatably secured thereto a pulley 180. The pulley 180, upon being rotated by the motor 176, frictionally drives a V-belt 182 which in turn rotates a driven sheave 184. The driven sheave 184 is nonrotatably mounted upon a splined displaceable shaft 186 which extends through the piston (not shown) of the cylinder 188. The casing 189 of the cylinder 188 is integrally secured to a front plate 190 of the bracket 166 as, for example, by welding. The cylinder unit per se may be of the type manufactured by Hypneumat, Incorporated, of Milwaukee, Wisconsin.

Attached at the lower end of the driven shaft 186 at 187 is a chuck-secured cutter tool 191 having a pilot extension 190 shaped and sized to fit within the inside diameter of the finish opening 192 of the bottle 16. The cutting tool 191 has cutting edges along the bottom of the blade members 194 so that, as the motor 176 rotates both the shaft 186 and the cutter tool 191, the cutting edges 194 will machine the waste material from the finish opening of the bottle 16 in the form of chips or fragments. The shaft 186 has a central hollow passage (not shown) with openings 195 in the pilot 190. Air or the like from a suitable source (not shown) is forced under pressure through an inlet conduit 197 down the passage into the interior of the bottle finish and out the finish opening 192 at the blades 194. The fragments cut by the blades 194 are immediately evacuated from the region of the finish opening 192 by a vacuum created by a suction blower (not shown) through vacuum hose 196.

The cutting tool 191 is displaced by means of the cylinder 188. The shaft 186 is integral with and, thus, is displaceable with the piston of the cylinder 188 through a fixed distance governed by the location of a rigid adjustable stop 199. A plate 201 moves with the shaft 186 and engages the stop 199 when the aforementioned distance has been traversed. Nonrotatably secured to piston shaft 186 is a sleeve 179 which surrounds the shaft 186 and the cutting element 191. In the vicinity of the cutting element 191 and opening onto the interior of the sleeve 179 is the vacuum hose 196. The rigid adjustable stop 199 is initially adjusted with reference to its height above the final finish opening 192 of the container 16.

Thus, the cutting tool 191 machines the finish opening 192 to a horizontal plane which is referenced to the finish threads contained within the matching grooves in the rear and front locators 94 and 120 of the fixture 70 and not with respect to the body of the bottle 16. Hence, warpage or other distortion of the bottle 16 which occasionally occurs as the body of the bottle cools or is distorted while still warm following formation, does not cause misalignment between the finish and the closure sealing surface.

OPERATION

Reference is now made to all of the FIGURES 1 through 4, inclusive, which respectively illustrate the over-all facing apparatus, the facing mechanism per se, the pneumatic apparatus of the over-all facing apparatus, and the electrical portion of the facing apparatus, respectively.

Figure 3:
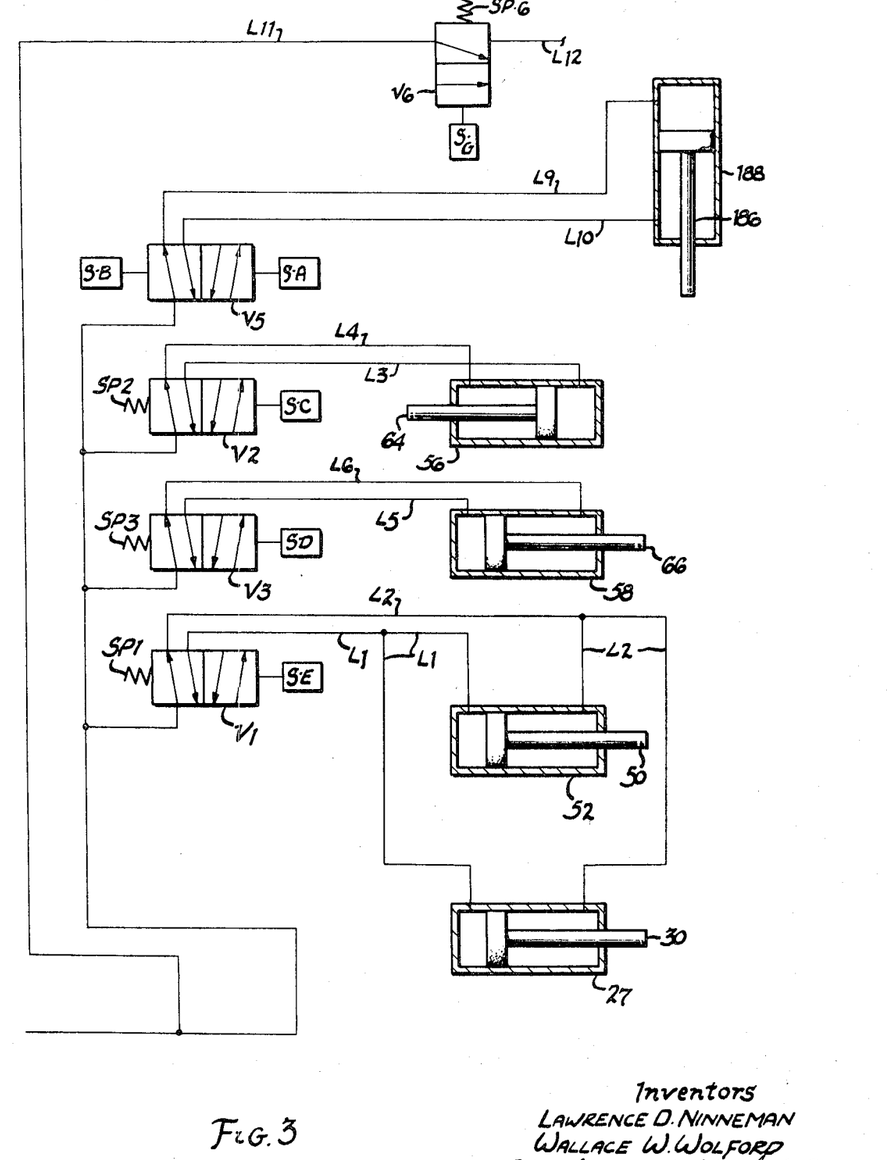
FIGURE 3 is a schematic of the pneumatic portion of the apparatus of FIGURE 1.
Figure 4:
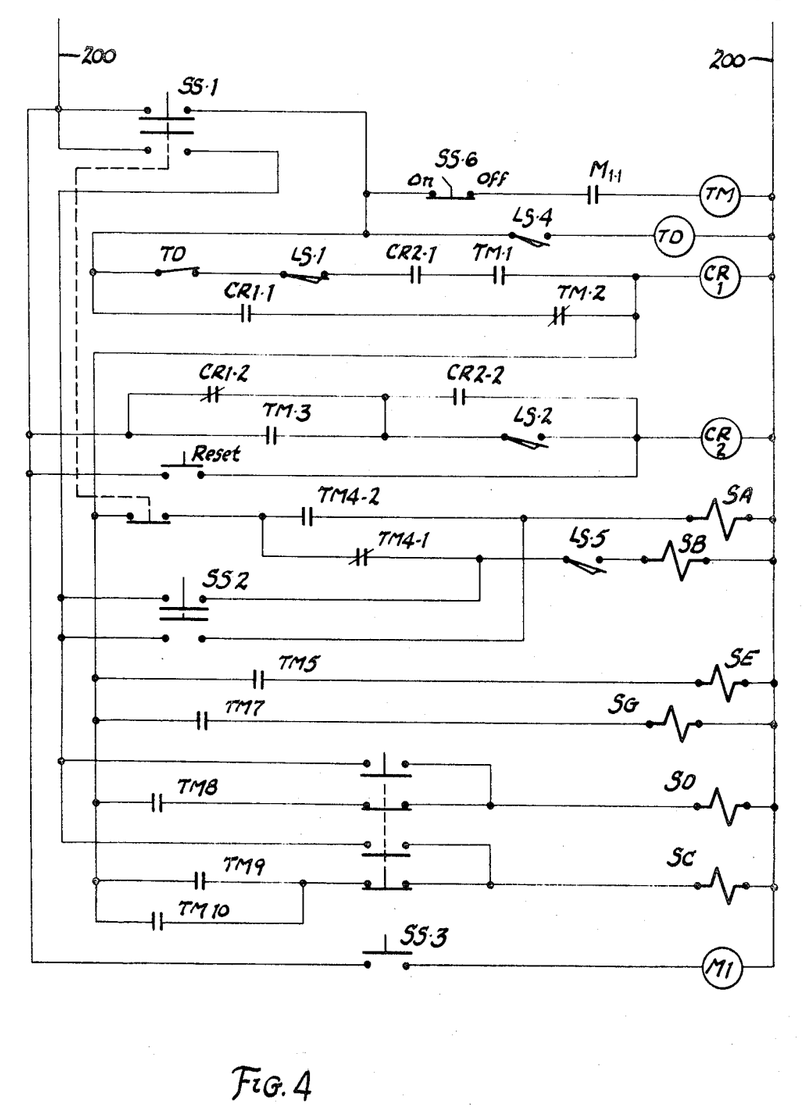
FIGURE 4 is a schematic of the electrical portion of the apparatus of FIGURE 1.

The control of the above-described over-all facing apparatus operation is accommodated through a series of electrical timers which operate solenoid valves, as depicted in FIGURES 3 and 4. The timing mechanism consists of a series of cams which operate microswitches. The cams are driven by an electric motor and one complete revolution of the cam shaft constitutes one cycle of the facing apparatus. Since such cam timing mechanisms are well known in the art, they need not be disclosed in detail.

Four limit switches, LS-1, LS-2, LS-4 and LS-5 are used in conjunction with the electrical portion of the disclosed presently preferred embodiment of this invention and are located generally in the positions depicted in FIGURE 1.

The limit switch LS-1 is used to indicate the existence of a bottle backlog at the bottle separator or reservoir mechanism 26; the limit switch LS-2 indicates that the facer or cutting tool 191 is in the down position; the limit switch LS-4 signals when a jam-up downstream of the facing station 14 exists and, at such time, de-energizes the cycle relay; and the limit switch LS-5 indicates when a bottle has been properly positioned and enclosed within the fixture 70 preparatory for facing of the finish opening.

With power supplied from lines 200 and 3-position switch SS-1 in the "up" position, the timer motor TM (FIGURE 4) is rendered operative, provided selector switch SS-3 has energized M-1 starter, thus closing contacts M-1-1. Actuation of the re-set button energizes CR-2. This relay is held energized by contacts CR2-2 (which closed when the relay was energized) and by the normally closed contacts CR1-2 of relay CR-1 when a cycle relay is not energized. Contacts CR2-1 in the cycle relay circuit are also closed when CR-2 is energized. When limit switch LS-4 is not made, the cycle may proceed. If LS-4 is made, indicating a jam-up of bottles downstream of the facing apparatus, time delay relay TD is energized. Contacts TD are opened for a predetermined time, thus preventing CR-1 from energizing. When limit switch LS-1 is closed (to indicate the existence of a backlog of bottles at the bottle separator mechanism 26) the momentary closure of the timer contact TM-1 energizes the cycle relay CR-1. CR-1 is held energized through timer contacts TM-2 and through relay contacts CR1-1. The circuitry as described above indicates that all conditions have been met to start the actual sequencing of the machine which follows.

Timer TM-5 is closed and actuates a solenoid S-E which extends the bottle stop rod 50 of the cylinder 52 (see FIGURE 3) by displacing the valve V-1 responsive to energization of the solenoid S-E to accommodate flow of air through the air line L-1 into the rear of the cylinder 52 while air in the forward, rod end of the cylinder 52 is exhausted through the line L-2. Energization of the solenoid S-E and the corresponding displacement of the valve V-1 also extends the rod 30 of the bottle separator cylinder 27 by introduction of air through the line L-1 into the rear of the cylinder 27, while air is exhausted from the rod end of the cylinder 27 through the line L-2.

The apparatus 10 has now commenced the facing cycle. Extension of the piston rod 30, as previously described, rotates the fork separator 24 to discharge a single bottle 16 from the bottle separator mechanism 26, which discharged bottle is conveyed by the conveyor 12 to the facing station 14 where it is intercepted by the extended stop rod 50. Thus, the intercepted bottle 16 momentarily remains stationary while the belt 13 of the conveyor 12 moves frictionally across the bottom of that bottle.

The piston 64 of air cylinder 56 is advanced from its retracted position until the saddle 106 contacts one side surface of the body of the intercepted bottle 16.

This is achieved by actuation of time contact TM-9 which energizes solenoid S-C (FIGURE 4). Energizing of the solenoid S-C, with reference to FIGURE 3, displaces the spool of the valve V-2 which extends the discharge pusher rod 64 of the cylinder 56, urging the attached saddle 106 into engagement with the intercepted bottle 16. This is accomplished by introduction of air under pressure to line L-3 into the rear of the cylinder 56 while air is exhausted from the rod side of the cylinder 56 through the line L-4.

As the cylinder 56 completes its extension of the rod 64, the feeder pusher cylinder 58 is extended to bring the saddle 136 into abutment with the other side of the body of the intercepted bottle 16. This is done by energizing the solenoid S-D (FIGURE 4) through the timer contact TM-8. At the same time the discharge cylinder 56 is retracted responsive to the opening of the timer TM-9 and a consequent de-energizing of the solenoid S-6. Energizing of the solenoid S-D displaces the spool of the valve V-3 accommodating introduction of air under pressure through the line L-5 into the rear of the cylinder 58 while the air in the rod end of the cylinder 58 is exhausted through the line L-6 whereby the piston rod 66 is extended with the fixture portion 74 attached thereto. At this point in time, the intercepted bottle 16 is encircled or enclosed within the saddles 106 and 136 in the manner previously described.

The de-energizing of the solenoid S-C permits the spring SP-2 to displace the spool of the valve V-2, allowing introduction of air under pressure through the line L-4 into the rod end of the cylinder 56 and exhausting of air pressure from the rear of the cylinder 56 through the line L-3 to retract the piston rod 64 with its saddle 106 at the same time as the rod 66 is extended along with fixture portion 74, so as to maintain the saddles 106 and 136 in their fully closed positions as the bottle is displaced onto the table 150.

So positioned, the handle abutments 104 and 134 contact the integral handle 22 of the bottle 16 to rotationally orient the bottle 16, the longitudinal axis body of the intercepted bottle 16 will be accurately vertically aligned by reason of its confinement between the two saddles 106 and 136, and the rear locator 94 and the spring biased front locator 120 will be closed upon the finish of the intercepted bottle 16 so as to locate the threads of the bottle in matching grooves (not shown) machined in the finish-engaging surfaces of the locators 94 and 120. Thus, the body, the handle and the finish are situated so that the over-all position of the intercepted bottle 16 is in a precisely vertically disposed, accurately rotated, vertically locked posture.

The intercepted bottle is enclosed within the closed fixture 70 and has been displaced along with the saddles 106 and 136 laterally off from the conveyor belt 13 onto the table 150 to the position depicted in FIGURE 2. This closes the limit switch LS-5 which signals that the intercepted bottle 16 is in proper posture and position for facing of a closure sealing surface at the finish opening 192 in the manner previously described.

At this point, the rods 50 and 30 of the bottle stop cylinder 52 and the bottle separator cylinder 27, respectively, are normally retracted as the solenoid S-E is de-energized responsive to opening of the timer TM-5. De-energizing of the solenoid S-E permits the spring SP-1 to displace the spool of the valve V-1 to exhaust the air from the rear of the cylinders 27 and 52 through the line L-1 while introducing air under pressure into the rod end of those cylinders through the line L-2.

Thereafter, with the intercepted and encircled bottle 16 positioned in the reference posture depicted in FIGURE 2, the drilling unit 100 is continuously driven by motor 176 through the belt 182 and the belt sheaves 180 and 184. Thus, the cutting tool 194 is driven continuously by shaft 186. The cutting tool 194 is displaced, by extension of the piston of the cylinder 188, vertically downward a distance governed by engagement of the plate 201 and the stop 199 which is sufficient to cause the pilot 190 to fit within the finished opening 192 (FIGURE 2) and to accommodate machining of the finish opening to sever from the finish that length of waste material necessary to form a closure sealing surface referenced to the finish per se. The drilling unit or facing cylinder is extended downwardly responsive to de-energizing of the solenoid S-D through the timer TM-4-1. With the solenoid S-B energized and the solenoid S-A de-energized, the spool of the valve V-5 is displaced accommodating flow of air under pressure through the line L-9 into the rear of the facer cylinder 18 and exhaust of air from the rod end of the facer cylinder through the line L-10.

Chips or fragments machined from the finish opening are immediately evacuated from the area of the finish by means of forced air flowing through the shaft passage (not shown), the finish opening 195 and out the vacuum hose 196. The chip or fragment evacuating air blast passing through the port is actuated by energizing the solenoid S-G through the timer TM-7 as the tool 191 is downwardly displaced. Energization of the solenoid S-G displaces the spool of the valve V-6 to accommodate flow of air through the line L-11 into the line L-12 to create the described flow of air. A suction blower (not shown) creates a vacuum in line 196, exhausting the air and any chips in the area adjacent the cutting tool 191, thus carrying these chips away from the container and preventing the build up of chips at the cutting tool as well as in the container.

It is significant that upon completion of the machining operation the finish opening of the bottle 16 is provided with a closure sealing surface confined within a plane which is substantially perpendicular to the axis of the finish and is referenced not to the body of the bottle 16 but to the finish of the bottle at the threads.

Subsequently, the air blast is shut off and the drilling unit 100 is retracted to its elevated position by means of retraction of the shaft 186 by actuation of the cylinder 188. This is accomplished by de-energizing the solenoid S-G through opening of the timed TM-7 to de-activate the air blast, by permitting the spring SP-6 to displace the spool and valve V-6 so as to close off the flow of air between the lines L-11 and L-12. The facer cylinder is retracted responsive to energizing of the solenoid S-A responsive to closing of the timer contact TM-4-2 and de-energizing of the solenoid S-B by opening of the contacts of the timer TM-4-1. This displaces the spool of the valve V-5, allowing introduction of air under pressure through the line L-10 into the rod side of the facer cylinder 188 and exhausting of air from the rear of the cylinder 188 through the line L-9, thereby retracting the facer cylinder rod 186.

The rod 64 of the cylinder 56 is extended by closing of the timer TM-10 to energize the solenoid S-C. Energizing of the solenoid S-C displaces the spool of the valve V-2 accommodating flow of air under pressure through the line L-3 into the rear of the cylinder 56 and exhausting air under pressure from the rod side of the cylinder 56 through the line L-4. The opening of timer TM-8 de-energizes the solenoid S-D which accommodates displacement of the valve V-3 through the spring SP-3 to exhaust air from the rear of the cylinder 58 through the line L-5 and to introduce air into the rod end of the cylinder 58 through the line L-6.

The rod 64 of the cylinder 56 is retracted by opening of the timer TM-10 which de-energizes the solenoid S-C. Thus, the faced bottle 16 is left resting in a vertically upright position upon the conveyor belt 13 and is conveyed from the facing station 14 downstream for performance of subsequent operations, including packaging of the bottle for shipment to the ultimate user.

LS-2 is a safety switch which works in conjunction with timer switch TM-3. At the prescribed time that the cutting tool should be at the bottom of its stroke, i.e. when stop 199 is engaged by plate 201, the limit switch LS-2 should be made. If LS-2 is not made, then the head 191 has not reached the desired position of downward travel and thus completed finishing operations.

Upon retraction of the cutting tool 191 and transfer of the bottle 16 from its position in FIGURE 2 to its position in FIGURE 1, LS-2 prevents re-cycling of the apparatus until the re-set button is manually pushed, by preventing energization of CR-2.

The invention may be embodied in other specific forms without departing from the spirit or essential characteristics thereof, as, for example, this apparatus may be arranged to function with containers whose finishes are not provided with threads. Also, the apparatus may be coordinated to operate with the handles projecting upstream of the device, rather than downstream, as described.

The present embodiment is, therefore, to be considered in all respects as illustrative and not restrictive, the scope of the invention being indicated by the appended claims rather than by the foregoing description; and all changes which come within the meaning and range of equivalency of the claims are, therefore, intended to be embraced therein.

What is claimed and desired to be secured by United States Letters Patent is:

1. In a method of providing a closure sealing surface by facing the finish opening of plastic containers, each container having a body portion and an offset finish having an integral wastable portion adjacent finish threads and an integral handle adjacent the offset finish, as the containers are periodically delivered to a facing station, the steps of successively transporting the containers along a conveyor to the facing station, intercepting the conveyance of each container at the facing station, generally encircling the intercepted container in a closable fixture to position the container body vertically, displacing the fixture and the generally enclosed container from the conveyor surface to a position of proximity to and alignment with a facing mechanism, engaging the container handle portion to rotatably locate said offset finish, engaging the finish only to locate the final finish opening at a predetermined level, relatively retaining the container in its engaged and displaced position while relatively displacing the facing mechanism to separate the waste portion from the finish precisely along a plane referenced to the finish threads to form an even sealing surface at the finish opening, repositioning the faced container on the conveyor, removing the faced container from the fixture and resuming conveyance of the faced container for subsequent processing.

2. A method as defined in claim 1 in which the separating of the waste portion from the finish is accomplished by machining off the cut end in the form of waste fragments until the sealing surface is acquired, the fragments being exhausted from the vicinity of the finish by a stream of forced air.

3. In a method as defined in claim 1 in which the fixture is first moved to and closed upon the container while the container rests upon the conveyor at the facing station and thereafter the fixture and container are jointly laterally shifted to separate the container from the conveyor, and in which the facing mechanism is fully displaced while the finish is retained stationary to separate the waste portion from the finish rather than displacing the container through any part of the relatively displaced distance.

4. In an automatic facing mechanism for a plastic container manufacturing apparatus in which a container having an integral waste portion at the offset finish opening adjacent finish threads and an integral handle laterally adjacent the finish is provided with a closure sealing surface at the finish opening by separating the waste portion from the finish with reference to the threads, an openable-closable fixture comprising complementary saddles each of which is separately displaceable by power means to receive the container and to position the container therebetween in a true vertical position, a pair of handle abutments one of which is movable with one of said saddles and the other of which is fixed for engaging said handle to rotate said container, and thread-engaging brackets having complementary surfaces respectively engaging and mating with the finish threads to locate the finish opening in a predetermined position, and means for separating the wastable portion from the finish along a plane referenced to the finish threads.

5. In a method of making a container having a neck portion provided with peripheral threads and surmounting a container body portion, the neck surrounding a dispensing opening which is eccentric to the longitudinal axis of the container and also having an integral handle lying in a plane substantially radial to said longitudinal axis, and wherein the container, as made, has an integral waste portion forming an extension of said neck portion, the steps of (1) engaging the container body to position said container axis vertically, (2) engaging the container handle to orient the container rotationally about said axis, and (3) engaging said peripheral threads to position said dispensing opening at a predetermined level independently of the position of said body portion, and relatively moving the so-engaged container and a rotatable facing tool to remove said waste portion.

6. In a fully automatic method of providing a closure sealing surface by facing the finish opening of plastic containers, each having an integral waste portion at the finish opening adjacent threads, as the containers are serially delivered to a facing station following removal from a container forming apparatus, the steps of successively transporting the containers along a conveyor to the facing station, intercepting the conveyance of each container at the facing station, generally encircling the intercepted container in a closable fixture thereby causing the container to assume a predetermined posture by vertically positioning the body of the container, displacing the fixture and the generally enclosed container to a position of proximity to and alignment with a facing mechanism, clamping the container finish at a predetermined and fixed level, relatively retaining the fixture with the generally encircled container in the displaced position while relatively displacing the facing mechanism to separate the waste portion from the finish precisely along a plane referenced to the finish threads to form an even sealing surface at the finish opening, repositioning the faced container on the conveyor, opening the fixture enabling the container to resume its conveyance for subsequent processing.

7. In a method of making a container having a finish portion surrounding a dispensing opening and surmounting a container body portion, and wherein the container as made has an integral waste portion forming an extension of said finish portion, the steps of engaging the container body solely to position said container axis vertically, engaging said container to orient the same rotationally about said axis, engaging said finish portion to position said dispensing opening at a predetermined level independently of the position of said body portion, and aligning the so-engaged finish portion vertically with a rotatable facing tool, and then relatively moving the tool and the so-engaged container to remove said waste portion.

8. In a method of making a container having a finish provided with peripheral threads and surmounting a container body portion, the finish surrounding a dispensing opening, and wherein the container as made has an integral waste portion forming an extension of said finish portion, the steps of engaging the container body to position said container axis vertically, engaging said container body to position said container rotationally about said axis, engaging said peripheral threads to position said dispensing opening at a predetermined level independently of the position of said body portion, and relatively moving the so-engaged container and a rotatable facing tool to remove said waste portion.

9. In a fully automatic method of providing a closure sealing surface by facing the finish opening of plastic containers each having an integral waste portion at the finish opening as the containers are preiodically delivered to a facing station following removal from a container forming apparatus, the steps of successively transporting the containers to the facing station, generally encircling each container in a closable fixture, displacing an engaged container away from the path of movement thereof during said transporting step to align the container with a facing mechanism, engaging the finish to position the same in a predetermined posture at a preselected elevation with respect to the container, and retaining the fixture along with the generally encircled container in position while relatively displacing the facing mechanism to separate the waste portion from the finish to form an even sealing surface at the finish opening.

10. In an automatic facing mechanism for a plastic container manufacturing apparatus in which a container having an integral waste portion at the finish opening adjacent the threads and an integral handle adjacent the finish is provided with a closure sealing surface at the finish opening by separating the waste portion from the finish with reference to the threads, an openable-closable fixture displaceable by power means into which the container is recived and positioned in a predetermined vertical posture, means for disposing the integral handle in a reference position, means aligning the body of the container in a predetermined alignment and means situating the finish in a predetermined position with respect to the finish threads.

11. In an automatic facing mechanism for a plastic container manufacturing apparatus which faces the sealing surfaces on containers each having an integral waste portion at the finish opening adjacent the threads and which are periodically delivered from a container forming device to the facing station, a conveyor for successively transporting the containers to the facing station, a reciprocable stop for intercepting the conveyance of each container at the facing station, means for rotationally orienting each intercepted container, thread engaging means for positioning each intercepted container in a predetermined reference posture with respect to the finish threads out of contact with the conveyor and a facing device aligned with said reference posture for separating the waste portion from the finish with respect to the finish threads.

12. In an automatic facing mechanism for a plastic container manufacturing apparatus in which a container having waste material integral with a finish portion of the container is provided with a closure sealing surface at the end of the finish by separating the waste material from the finish, an openable-closable fixture engageable with the container to position the container in a predetermined posture, means engageable with a portion of said container to rotate said container to a predetermined rotational orientation, finish-engaging means engageable with the finish portion of said container to locate the final finish opening in a predetermined position, and tool means for separating the waste material from said finish portion of said container along a plane referenced to said finish portion.

13. In a method of making a container having a neck portion surmounting a container body portion and having integral waste material forming an extension of said neck portion, the steps of (1) engaging the container body portion to position said container vertically, (2) engaging a portion of said container to orient the container rotationally, about the axis thereof, (3) engaging said neck portion of said container to position said neck portion at a predetermined level independently of the position of said body portion, and (4) relatively moving the so engaged container and a facing tool to remove said waste material from said neck portion.

14. In a method of providing a closure sealing surface on plastic containers by facing a finish portion of the containers to remove integral waste material therefrom, the steps of transporting the containers in succession to a facing station, grasping each container at the facing station with a fixture to position the container vertically, displacing the fixture and the container therewith to a position adjacent a facing mechanism, clamping the container finish portion at a predetermined level, relatively displacing the fixture with the container and the facing mechanism to remove the waste material from the finish portion of the container to form an even sealing surface on the finish portion, unclamping said finish portion and releasing said container body, and transporting said container away from said facing station.

15. In an automatic facing mechanism for a plastic container manufacturing apparatus in which a container having waste material integral with a finish portion of the container is provided with a closure sealing surface at the end of the finish portion by separating the waste material from the finish portion, an openable-closable fixture, power means for actuating said fixture to grasp the container and position the same in a predetermined posture, means for rotationally orienting the container in a reference position, and means for situating the finish portion of the container in a predetermined position independently of the container body.

References Cited

UNITED STATES PATENTS

| | | | |
|---|---|---|---|
| 3,127,636 | 4/1964 | Heider | 18—5 |
| 3,230,602 | 1/1966 | Bozek | 83—51 X |

LEONIDAS VLACHOS, Primary Examiner

U.S. Cl. X.R.

29—33